(12) United States Patent
Kobayashi

(10) Patent No.: US 7,532,287 B2
(45) Date of Patent: May 12, 2009

(54) OPTICAL COMPENSATION SHEET COMPRISING A LIQUID CRYSTAL LAYER WIDER THAN AN ORIENTED LAYER

(75) Inventor: Teruo Kobayashi, Odawara (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 12/078,497

(22) Filed: Apr. 1, 2008

(65) Prior Publication Data

US 2008/0212002 A1    Sep. 4, 2008

Related U.S. Application Data

(62) Division of application No. 11/090,210, filed on Mar. 28, 2005, now Pat. No. 7,372,532.

(30) Foreign Application Priority Data

Mar. 26, 2004    (JP)    .............................. 2004-093646

(51) Int. Cl.
*G02F 1/1335* (2006.01)
(52) U.S. Cl. ..................................... 349/117; 349/123
(58) Field of Classification Search ................. 349/117, 349/96, 123, 138, 158, 127
See application file for complete search history.

(56) References Cited

U.S. PATENT DOCUMENTS 6,812,982 B2    11/2004    Ishizuka et al.

FOREIGN PATENT DOCUMENTS

| EP | 1341008 | 9/2003 |
|---|---|---|
| JP | 2002267839 | 9/2002 |
| JP | 2003329833 | 11/2003 |

*Primary Examiner*—Thoi V Duong
(74) *Attorney, Agent, or Firm*—Young & Thompson

(57) ABSTRACT

An optical compensation sheet comprising an oriented layer on a surface of a substrate and a liquid crystal layer on the oriented layer, wherein the oriented layer is covered with the liquid crystal layer and the width of the liquid crystal layer is greater than the width of the oriented layer.

6 Claims, 3 Drawing Sheets

OPTICAL COMPENSATION SHEET COMPRISING A LIQUID CRYSTAL LAYER WIDER THAN AN ORIENTED LAYER

BACKGROUND OF THE INVENTION

1. Field of the Invention

The present invention relates to a method of manufacturing an optical compensation sheet and the optical compensation sheet, and more particularly, to a method of manufacturing an optical compensation sheet composed of an orientation layer formed on a substrate and a liquid crystal layer formed on the orientation layer, and to the optical compensation sheet.

2. Related Art

A liquid crystal display device is constituted of liquid crystal cells, polarizing elements and an optical compensation sheet (phase difference board). The optical compensation sheet is used for eliminating coloring of images and enlarging a viewing angle. As the optical compensation sheet, a drawn polymer film has been used up to present. However, in recent years, it has been proposed to use an optical compensation sheet having an optical anisotropic layer formed of liquid crystal molecules on a transparent substrate, in place of the drawn polymer film.

Such an optical compensation sheet is manufactured by coating an oriented layer on the surface of a long polymer sheet while feeding the polymer sheet continuously, dehydrating it, applying rubbing treatment onto the surface of the oriented layer, and applying a solution of a liquid crystal compound in an organic solvent onto the oriented layer (see Japanese Patent Application Laid Open No. 2003-329833). The optical compensation sheet thus manufactured is shipped and delivered to a manufacturer, and then, subjected to saponification and processed into a polarizing plate. The saponification for polarizing plate is performed by using a saponification liquid such as sodium hydroxide having a concentration of 5 to 20% by weight at a temperature of about 25 to 80° C. (see Japanese Patent Application Laid Open No. 2002-267839).

SUMMARY OF THE INVENTION

However, a conventional optical compensation sheet has a problem in that film is removed in the saponification step of a process for a polarizing plate.

The present invention was attained in view of such a problem and directed to providing a method of manufacturing an optical compensation sheet capable of preventing removal of film, and the optical compensation sheet.

According to a first aspect of the invention, to attain the object, there is provided a method of manufacturing an optical compensation sheet comprising the steps of:

an oriented layer coating step in which an oriented layer is coated on the surface of a long substrate while allowing the substrate to run; and a liquid crystal layer coating step in which a liquid crystal layer is coated on the oriented layer;

in which the liquid crystal layer is coated wider than the oriented layer, thereby covering the oriented layer with the liquid crystal layer.

According to the first aspect of the invention, since the oriented layer is covered with the liquid crystal layer having a higher chemical resistance than the oriented layer, it is possible to prevent removal of film during the saponification performed after the liquid crystal layer is formed.

The invention of a second aspect of the invention is characterized in that the method according to the first aspect further comprises, before the oriented layer coating step, a saponification step in which the surface of the substrate is saponified wider than the oriented layer is coated. In this method, the oriented layer is coated within the area saponified in the step of applying saponification.

According to the second aspect of the invention, since the oriented layer is coated within the saponified area, the adhesiveness between the oriented layer and the substrate is improved over the entire surface of the oriented layer. Therefore, it is possible to prevent removal of film during the rubbing treatment after the oriented layer is coated.

According to a third aspect of the present invention, to attain the aforementioned object, there is provided an optical compensation sheet comprising an oriented layer on a surface of a substrate and a liquid crystal layer on the oriented layer, in which the oriented layer is covered with the liquid crystal layer.

According to the third aspect of the invention, since the oriented layer is covered with the liquid crystal layer having higher chemical resistance than the oriented layer, it is possible to prevent removal of film during the saponification of the optical compensation sheet.

According to a fourth aspect of the invention, in the optical compensation sheet according to the third aspect, the oriented layer is characterized by being formed on the substrate within the area saponified in a larger width than the oriented layer.

According to the fourth aspect of the invention, since the oriented layer is formed within the range of saponification, the adhesiveness between the oriented layer and the substrate is improved over the entire surface of the oriented layer. Therefore, it is possible to prevent removal of film during the rubbing treatment after the oriented layer is coated.

According to a method of manufacturing an optical compensation sheet and the compensation sheet, it is possible to prevent removal of film during the saponification after the liquid crystal layer is formed.

DETAILED DESCRIPTION OF THE PREFERRED EMBODIMENTS

Preferred embodiments for a method of manufacturing an optical compensation sheet and the optical compensation sheet according to the present invention will be described with reference to the accompanying drawings.

Figure 1:
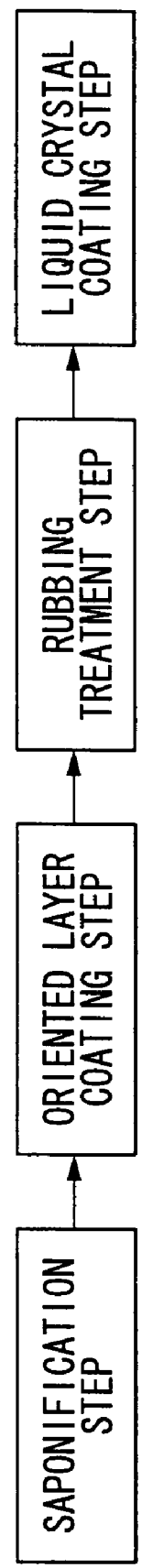
FIG. 1 is a block diagram showing a constitution of a method of manufacturing an optical compensation sheet to which the present invention is applied.

FIG. 1 shows a block diagram showing a constitution of a method of manufacturing an optical compensation sheet to which the present invention is applied.

As is shown in FIG. 1, the optical compensation sheet is manufactured by a saponification step, oriented layer-layer coating step, rubbing treatment step, and liquid crystal layer coating step.

Figure 2:
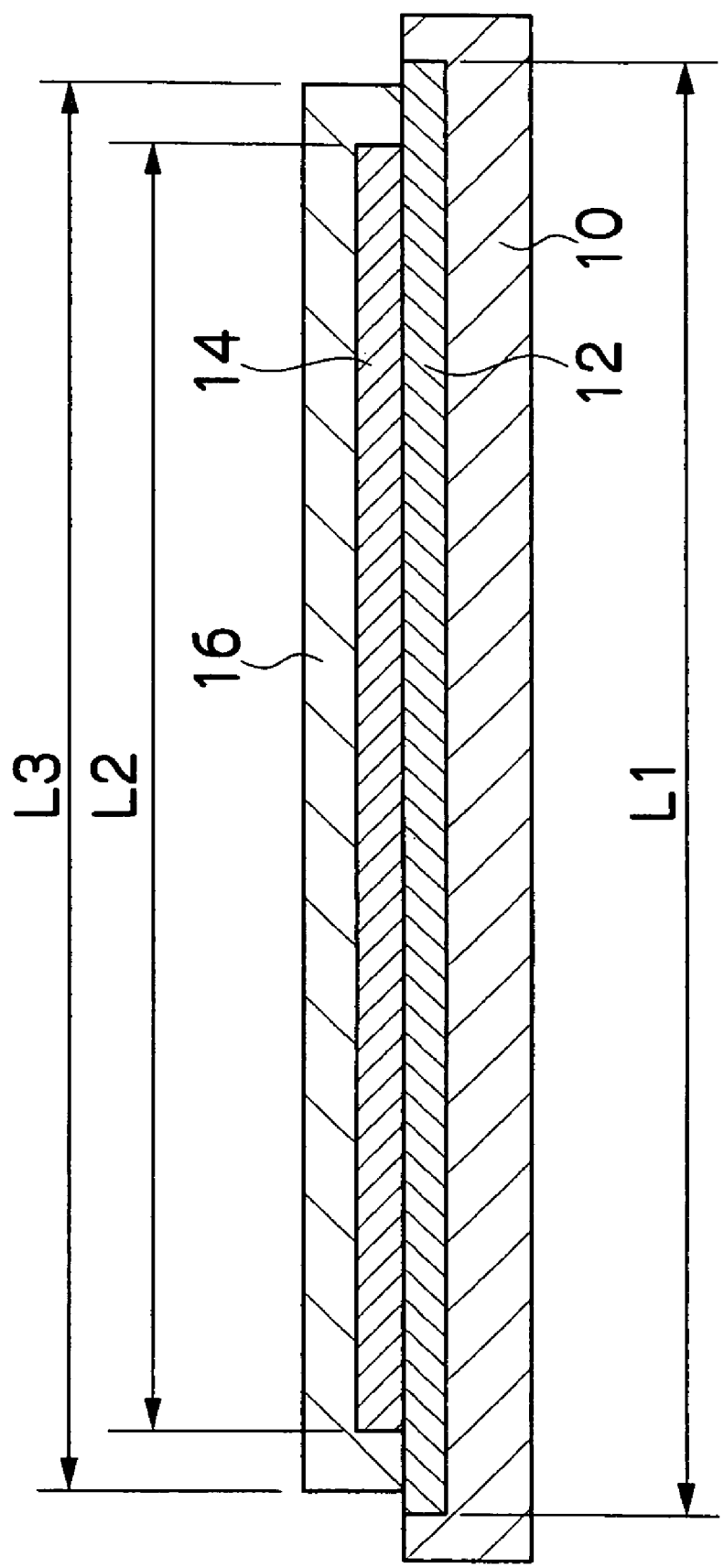
FIG. 2 is a sectional view of an optical compensation sheet for use in showing the relationship between coating widths L1, L2, and L3.

In the saponification step, an alkaline solution is applied on the long sheet to in a width of L1 (see FIG. 2). Thereafter, the sheet is allowed to stand still at room temperature or more for a predetermined time. Subsequently, a diluted solvent or an acidic solution is applied to the sheet to terminate the reaction taking place on the sheet. Then, after the alkaline solution is washed off from the sheet, the sheet is dried. The sheet thus saponified is subjected to the oriented layer coating step. In this step, on the surface of the sheet saponified, an oriented layer is formed in a width of L2 (see FIG. 2) by coating, followed by dehydrating. In this way, the oriented layer is formed on the surface of the sheet.

The sheet having the oriented layer formed thereon is subjected to the rubbing treatment step. In the rubbing treatment step, the surface of the oriented layer is rubbed by a rubbing roll or the like.

The sheet treated by rubbing is subjected to the liquid crystal coating step. In the liquid crystal coating step, a liquid layer is formed in a width of L3 by coating (see FIG. 2). The liquid layer is dried and cured with UV irradiation. In this manner, an optical compensation sheet is manufactured in which an oriented layer is formed on a sheet substrate and a liquid crystal layer is formed on the oriented layer.

FIG. 2 is a sectional view of an optical compensation sheet for use in showing the relationship between coating widths L1, L2, and L3. More specifically, FIG. 2 schematically shows a sectional view of the optical compensation sheet taken along the thickness direction. In the figure, reference numeral 10 designates a sheet, reference numeral 12, a saponified portion (that is, a portion to which alkaline solution is applied). Furthermore, reference numeral 14 designates an oriented layer and the reference numeral 16, a liquid crystal layer.

As shown in FIG. 2, the coating width L1 of the alkaline solution is formed larger than the coating width L2 of the oriented layer. In other words, the oriented layer is formed within the area coated with the alkaline solution.

The coating width L3 of the liquid crystal layer is formed larger than the coating width L2 of the oriented layer. The oriented layer is completely covered with the liquid crystal layer. The liquid crystal layer is preferably wider by 1 mm or more per side and more preferably by 2 mm or more per side.

Note that the relationship between the coating width L1 of the alkaline solution and the coating width L3 of the liquid crystal layer is not particularly limited.

Now, the function of the optical compensation sheet manufactured by the method mentioned above will be described.

The optical compensation sheet thus manufactured is shipped and delivered to a manufacturer and then processed by the manufacturer into a polarizing plate. In the polarizing plate processing step, the rear surface of the optical compensation sheet is saponified. In the saponification, an alkaline solution is preferably applied only to the rear surface of the optical compensation sheet. Optionally, a method of soaking the optical compensation sheet completely in the alkaline solution may be employed. Therefore, when the oriented layer is low in chemical resistance, it reacts with the alkaline solution, with the result that removal of film may possibly take place.

In contrast, according to an embodiment of the present invention, the oriented layer is covered with the liquid crystal layer having higher chemical resistance than the oriented layer. Therefore, even if the optical compensation sheet is saponified in its entirety, the oriented layer is not brought into contact with the alkaline solution. Hence, it is possible to prevent removal of the oriented layer.

Furthermore, in the manufacturing line for a conventional optical compensation sheet, when the oriented layer is coated and dried, the adhesiveness between the oriented layer and the sheet becomes weak at an edge portion in the thickness direction, with the result that the oriented layer may possibly removed from the sheet at the edge portion during the rubbing treatment.

In contrast, in this embodiment of the present invention, since the oriented layer is formed within the region saponified, the adhesiveness between the entire oriented layer and the sheet is improved. Since the edge portion of the oriented layer is securely adhered tight to the sheet, there is no possibility of removing the oriented layer from the sheet even if rubbing treatment is applied. Hence, it is possible to prevent removal of the film during the rubbing treatment.

Figure 3:
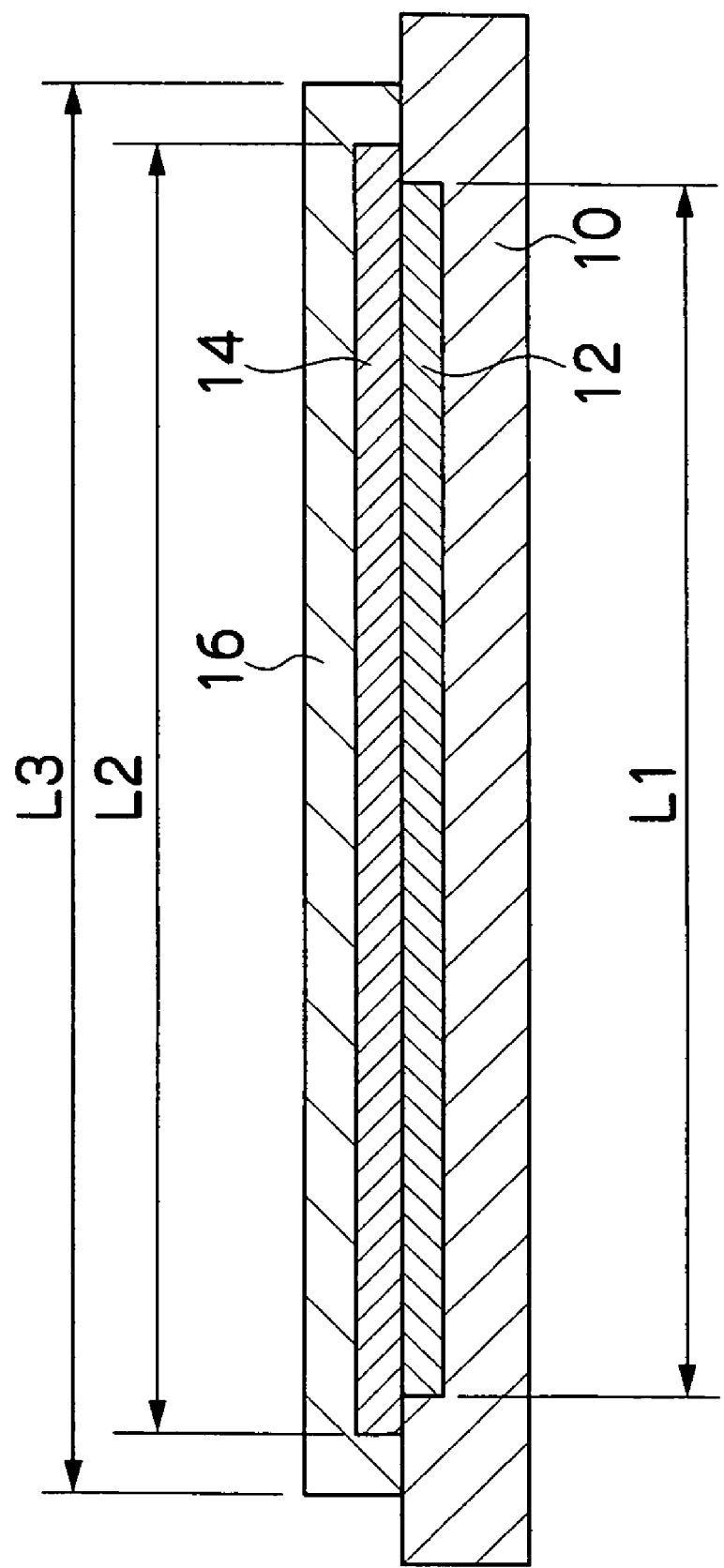
FIG. 3 is a sectional view of another optical compensation sheet (different from the sheet shown in FIG. 2).

Note that in the embodiment mentioned above, both of the coating widths L1 and L3 are set at a larger extent than the coating width L2. However, the present invention is satisfied as long as the coating width L3 is larger than the coating width L2. Therefore, as is shown, for example, FIG. 3, the coating width L1 may be smaller than the coating width L2. Also in this case, it is possible to prevent removal of film during the saponification step performed later, by setting the coating width L3 larger than the coating width L2.

Furthermore, in the embodiment above, to form the oriented layer within the region saponified without fail, and cover the oriented layer completely with the liquid crystal layer, it is preferable to employ a raw sheet automatic aligning system or a web aligning system.

In the raw sheet automatic aligning system, alignment of the edge of a raw sheet is performed when the sheet is fed out from a feeder having raw sheets stored therein. By the alignment of the edge of a raw sheet, the position of the sheet and the coating position can be easily matched with each other in the coating unit arranged downstream. The raw sheet automatic aligning system is, for example, constituted of an infrared light projecting unit, a secondary image sensor, and an image processing device. Infrared light is applied to the edge portion of a raw sheet obliquely from the above by the infrared projecting unit. Subsequently, an image of the edge portion irradiated is taken from the overhead by the secondary image sensor. Based on the image, the position of the edge portion of the raw sheet is detected. Based on the position of the edge of the raw sheet, the right and left moving rate of the raw sheet is controlled by a two-step rate shifter. In this way, it is possible to align the edge of the raw sheet with a desired position and reduce the positional deviation between the sheet and the coating position in a coating unit arranged downstream.

On the other hand, the web aligning system is used for aligning the position of a sheet while feeding in each step. This system is particularly useful when the saponification step, oriented layer coating step, and liquid crystal layer coating step are continuously performed. By aligning the sheet after coating, positional accuracy on coating can be improved. As a web alignment system, use may be made of an edge alignment control unit (e.g., EPC device manufactured by Nireko) or a center position control device (e.g., CPC device manufactured by Nireko) in the case of a wide sheet. The web alignment system can be applied to sheet winding step to align the edge portion of the sheet in winding.

Now, the sheet mentioned above and individual steps will be described more specifically below.

[Polymer Film]

The polymer film used herein is preferably has a light permeability of 80% or more. A preferable polymer film is one in which birefringence hardly develops even when external force is applied. The polymer contains a hydrolysable bond such as an ester bond or an amide bond (a bond attacked by saponification). For this sense, an ester bond is preferable, and an ester bond present at a side chain of a polymer is more preferable. As a polymer having an ester bond at a side chain thereof, a cellulose ester is a typical example. A lower aliphatic ester of cellulose is more preferable, cellulose acetate is further preferable, and cellulose acetate having an acetylation degree of 59.0 to 61.5% is the most preferable. The acetylation degree used herein refers to the amount of acetic acid binding to cellulose per cellulose unit. The acetylation degree is determined and calculated based on ASTM: D-817-91 (test method for cellulose acetate and the like).

The viscometric degree of polymerization (DP) of a cellulose ester is preferably 250 or more, and more preferably 290 or more. The cellulose ester to be used in the present invention preferably has a narrow molecular distribution of Mw/Mn (Mw stands for mass average molecular weight and Mn stands for number average molecular weight) obtained by gel permeation chromatography. More specifically, the value of Mw/Mn is preferably 1.0 to 1.7, more preferably 1.3 to 1.65, and most preferably 1.4 to 1.6.

A polymer film to be used in an optical compensation sheet preferably has a high retardation value. The Re retardation value and Rth retardation value of a film are respectively defined by the following equations (I) and (II).

$$Re = |nx - ny| \times d \tag{I}$$

$$Rth = \{(nx+ny)/2 - nz\} \times d \tag{II}$$

In the equations (I) and (II), nx stands for an index of refraction along the in-plane phase retardation axis (an index of refraction is maximum); ny stands for an index of refraction along the in-plane phase advance axis (an index of refraction is minimum); nz stands for an index of refraction in the thickness direction of the film; and d stands for a thickness expressed by a unit order of nm. Re retardation value of the polymer film is preferably 1 to 200 nm and Rth retardation value is preferably 70 to 400 nm. Specific values are obtained by applying incident light with an angle to the direction vertical to the film surface and extrapolating the measurement results. Measurement is performed by use of an ellipsometer (e.g., M-150, manufactured by Nippon Bunko). As a wavelength, 632.8 nm (He-Ne laser) is used.

The retardation of a polymer film is generally controlled by applying external force such as drawing force. In this case, a retardation-increasing agent may be added as needed in order to control optical anisotropy. The molecular weight of the retardation increasing agent is preferably 300 to 800. Furthermore, to control retardation of a cellulose acrylate film, an aromatic compound having at least two aromatic rings is preferably used as a retardation increasing agent. The aromatic compound is preferably used in an amount of 0.01 to 20 parts by mass based on cellulose acrylate being 100 parts by mass, more preferably 0.05 to 15 parts by mass, and further preferably 0.1 to 10 parts by mass. Furthermore, not less than two types of aromatic compounds may be added.

An aromatic ring of the aromatic compound includes an aromatic hetero ring in addition to an aromatic carbon hydride ring. Generally, as the aromatic hetero ring, an unsaturated hetero ring, namely, 1,3,5-triazine ring, is particularly preferable. The number of aromatic rings contained in the aromatic compound is preferably 2 to 20, more preferably 2 to 12, further preferably 2 to 8, and most preferably 3 to 6.

The bonding form of two aromatic rings may be classified into (a) a case of forming a condensed ring, (b) the case of bonding then directly by a single bond, and (c) the case of bonding them via a linking group (The linking group cannot form a spiro bond since aromatic rings are to be linked). Any bonding form of (a) to (c) may be acceptable.

Examples of the condensed ring (a) (condensed ring formed of not less than two aromatic rings) include an indene ring, naphthalene ring, azulene ring, fluorene ring, phenanthrene ring, anthracene ring, acenaphthylene ring, naphthacene ring, pyrene ring, indole ring, isoindole ring, benzofuran ring, benzothiophene ring, indolizine ring, benzoxazole ring, benzothiazole ring, benzoimidazole ring, benzotriazole ring, purine ring, indazole ring, chromene ring, quinoline ring, isoquinoline ring, quinolizine ring, quinazoline ring, cinnoline ring, quinoxaline ring, phthalazine ring, pteridine ring, carbazole ring, acridine ring, phenanthridine ring, xanthene ring, phenazine ring, phenothiazine ring, phenoxathiin ring, phenoxazine ring, and thianthrene ring. Of them, naphthalene ring, azulene ring, indole ring, benzoxazole ring, benzothiazole ring, benzoimidazole ring, benzotriazole ring, and quinoline ring are preferable.

The single bond (b) is preferably a bond connection between carbon atoms of two aromatic rings. Two aromatic rings may be bonded via not less than two single bonds to form an aliphatic ring or non-aromatic heterocyclic ring between the two aromatic rings.

The linking group (c) may bind between carbon atoms of two aromatic rings. Such a linking group may be preferable an alkylene group, alkenylene group, alkynylene group, —CO—, —O—, —NH—, —S— or a combination thereof. Examples (c1 to c15) of a linking group formed by combining these linking groups are shown below. Note that right and left elements of the following linking groups may be exchangeable. c1: —CO—O—; c2: —CO—NH—; c3: -alkylene-O—; c4: —NH—CO—NH—; c5: —NH—CO—O—; c6: —O—CO—O—; c7: —O-alkylene-O—; c8: —CO-alkenylene-; c9: —CO-alkenylene—NH—; c10: —CO-alkenylene-O—; c11: -alkylene—CO—O-alkylene-O—CO-alkylene-; c12: —O-alkylene—CO—O-alkylene-O—CO-alkylene-O—; c13: —O—CO-alkylene-CO-O—; c14: —NH—CO-alkenylene-; c15: —O—CO-alkenylene-.

An aromatic ring and a linking group may have a substituent. Examples of such a substituent include a halogen atom (F, Cl, Br, I), hydroxyl, carboxyl, cyano, amino, nitro, sulfo, carbamoyl, sulfamoyl, ureido, alkyl group, alkenyl group, alkynyl group, aliphatic acyl group, aliphatic acyloxy group, alkoxy group, alkoxycarbonyl group, alkoxycarbonyl amino group, alkylthio group, alkylsulfonyl group, aliphatic amid group, aliphatic sulfone amide group, aliphatic-substituted amino group, aliphatic-substituted carbamoyl group, aliphatic-substituted sulfamoyl group, aliphatic-substituted ureido group, and non-aromatic heterocyclic ring group.

The number of carbon atoms of an alkyl group is preferably 1 to 8. A chain-form alkyl group is more preferable than a cyclic alkyl group. A straight chain alkyl group is particularly preferable. An alkyl group may further have a substituent (e.g., hydroxyl, carboxy, alkoxy, alkyl-substituted amino group). Examples of an alkyl group (including alkyl group serving as a substituent) include methyl, ethyl, n-butyl, n-hexyl, 2-hydroxyethyl, 4-carboxybutyl, 2-methoxyethyl, and 2-diethylamino ethyl.

The number of carbon atoms of an alkenyl group is preferably 2 to 8. A chain-form alkenyl group is more preferable than a cyclic alkenyl group. A straight chain alkenyl group is particularly preferable. An alkenyl group may have a substituent. Examples of an alkenyl group include vinyl, allyl, and 1-hexenyl. The number of carbon atoms of an alkynyl group is preferably 2 to 8. A chain-form alkynyl group is more preferable than a cyclic alkynyl group. A straight chain alkynyl group is particularly preferable. An alkenyl group may have a substituent. Examples of an alkynyl group include ethinyl, 1-butynyl, and 1-hexynyl. The number of carbon atoms of an aliphatic acyl group is preferably 1 to 10. Examples of an aliphatic acyl group include acetyl, propanoyl and butanoyl. The number of carbon atoms of an aliphatic acyloxy group is preferably 1 to 10. Examples of an aliphatic acyloxy group include acetoxy. The number of carbon atoms of an alkoxy group is preferably 1 to 8. An alkoxy group may further have a substituent (e.g., alkoxy group). Examples of an alkoxy group (including an alkoxy group serving as a substituent) include methoxy, ethoxy, butoxy, and methoxyethoxy. The number of carbon atoms of an alkoxycarbonyl group is preferably 2 to 10. Examples of an alkoxycarbonyl group include methoxycarbonyl and ethoxycarbonyl. The number of carbon atoms of an alkoxycarbonyl amino group is preferably 2 to 10. Examples of an alkoxycarbonyl amino group include methoxycarbonyl amino and ethoxycarbonyl amino. The number of carbon atoms of an alkylthio group is preferably 1 to 12. Examples of an alkylthio group include methylthio, ethylthio and octylthio. The number of carbon atoms of an alkylsulfonyl group is preferably 1 to 8. Examples of an alkylsulfonyl group include methansulfonyl and ethanesulfonyl. The number of carbon atoms of an aliphatic amide group is preferably 1 to 10. Examples of an aliphatic amide group include acetoamide. The number of carbon atoms of an aliphatic sulfonamide group is preferably 1 to 8. Examples of an aliphatic sulfonamide group include methane sulfonamide, butanesulfonamide, and n-octanesulfonamide. The number of carbon atoms of an aliphatic-substituted amino group is preferably 1 to 10. Examples of an aliphatic-substituted amino group include dimethylamino, diethylamino and 2-carboxyethylamino. The number of carbon atoms of an aliphatic-substituted carbamoyl group is preferably 2 to 10. Examples of an aliphatic-substituted carbamoyl group include methylcarbamoyl, and diethylcarbamoyl. The number of carbon atoms of an aliphatic-substituted sulfamoyl group is preferably 1 to 8. Examples of an aliphatic-substituted sulfamoyl group include methyl sulfamoyl and diethyl sulfamoyl. The number of carbon atoms of an aliphatic-substituted ureido group is preferably 2 to 10. Examples of an aliphatic substituted ureido group include methylureido. Examples of non-aromatic heterocyclic group include piperidino and morpholino.

A polymer film is preferably manufactured by a solvent cast method. In the solvent cast method, a film is manufactured by use of a solution (dope) containing a polymer material dissolved in an organic solvent. Such an organic solvent preferably include a solvent selected from the group consisting of ether having carbon atoms of 3 to 12, ketone having carbon atoms of 3 to 12 and halogenated hydrocarbon having carbon atoms of 1 to 6. Such an ether, ketone and ester may have a cyclic structure. A compound containing any two of functional groups of ether, ketone and ester (i.e., —O—, —CO—, and —COO—) can be used as an organic solvent. The organic solvent may have another functioning group such as an alcoholic hydroxyl group. In the case of an organic solvent having not less than two functional groups, the number of carbon atoms may fall within the defined range of a compound having any one of the functional groups.

Examples of ethers having 3 to 12 carbon atoms include diisopropyl ether, dimethoxymethane, dimethoxyethane, 1,4-dioxane, 1,3-dioxolane, tetrahydrofuran, anisole and phenetole. Examples of ketones having 3 to 12 carbon atoms include acetone, methylethyl ketone, diethyl ketone, diisobutyl ketone, cyclohexanone and methyl cyclohexanone. Examples of esters having 3 to 12 carbon atoms include ethyl formate, propyl formate, pentyl formate, methyl acetate, ethyl acetate and pentyl acetate. Examples of an organic solvent having not less than two types of functional groups include 2-ethoxyethyl acetate, 2-methoxy ethanol and 2-butoxy ethanol. The number of carbon atoms of a halogenated hydrocarbon is preferably 1 or 2 and most preferably 1. The halogen of the halogenated hydrocarbon is preferably chlorine. The rate of hydrogen atoms of the halogenated hydrocarbon substituted by halogen atoms is preferably 25 to 75% by mole, more preferably, 30 to 70% by mole, further preferably 35 to 65%, and most preferably, 40 to 60% by mole. Methylene chloride is a typical halogenated hydrocarbon. Furthermore, not less than two types of organic solvents may be mixed.

A polymer solution can be prepared in a general method. The general method means that a solution is treated at a temperature of 0° C. or more (room temperature or high temperature). The solution can be prepared in accordance with a method and a device for preparing a dope in a general solvent cast method. Note that, in the general method, a halogenated hydrocarbon (in particular, methylene chloride) is preferably used as an organic solvent. Preparation is made so as to contain a polymer in an amount of 10 to 40% by mass in the resultant solution. The amount of polymer is more preferably 10 to 30% by mass. In an organic solvent (main solvent), any additives (described later) may be added in advance. The solution can be prepared by stirring a polymer and an organic solvent at room temperature (0 to 40° C.). A high concentration solution may be stirred under pressure and heating. More specifically, a polymer and an organic solvent are placed in a pressure vessel. After the pressure vessel is closed tight, the polymer and the organic solvent are stirred and heated under pressure at a temperature from not lower than the boiling point of the solvent at an ambient pressure to lower than the point at which the solvent is boiled (under the pressure). The heating temperature is generally 40° C. or more, preferably 60 to 200° C., and more preferably 80 to 110° C.

Individual components may be roughly mixed and then placed in a vessel. Alternatively, they may be added one by one. The vessel is designed to have a stirring device. The vessel can be pressurized by introducing an inert gas such as nitrogen gas or may be pressurized by use of vaporization pressure of the solvent increasing with more heating. In addition, individual components may be added under pressure after the vessel is closed tight. The vessel is preferably heated by applying heat to the exterior of the vessel. For example, a jacket heating device can be used. Alternatively, a plate heater is provided at the exterior of the vessel piping is installed, and liquid is circulated, thereby heating the whole vessel. A stirring vane is preferably provided within the vessel to stir components. The length of the stirring vane is preferably long sufficient to reach the vicinity of the wall of the vessel. It is preferable that the end of the stirring vane is equipped with a scraped vane to refresh a liquid film on the wall of the vessel. The vessel may be equipped with measuring devices such as a pressure gauge and a thermometer. Individual components are dissolved in a solvent in the vessel. The dope thus prepared is cooled and thereafter taken out from the vessel, or it is taken out from the vessel and thereafter cooled by use of a thermo exchanger.

The solution can be prepared by dissolution and cooling. Dissolution and cooling makes it possible to dissolve a polymer in an organic solvent that rarely dissolves the polymer by a general dissolving method. Even if a solvent can dissolve a polymer by a general method, when a polymer is dissolved in the solvent in accordance with dissolution and cooling, the polymer is quickly dissolved to provide a homogenous solution. In this respect, dissolution and cooling is effective. In dissolution and cooling process, a polymer is first added gradually to an organic solvent at room temperature with stirring. The amount of polymer is controlled so as to contain the polymer preferably in an amount of 10 to 40% by mass, more preferably 10 to 30% by mass. Furthermore, arbitral additives as described later may be added in a mixture in advance.

Subsequently, the mixture is cooled to −100 to −10° C., preferably −80 to −10° C., more preferably −50 to −20° C., and most preferably −50 to −30° C. The cooling operation may be performed in a dry ice/methanol bath (−75° C.) or a cooled diethylene glycol solution (−30 to −20° C.). When cooled in this manner, the polymer-organic solvent mixture is solidified. The cooling rate is preferably 4° C./minute or more, more preferably 8° C./minute or more, and most preferably, 12° C./minute or more. The faster the cooling rate, the better. However, 10,000° C./second is a theoretical uppermost limit, 1,000° C./second is a technical uppermost limit, and 100° C./second is a practical uppermost limit. Note that the cooling rate is obtained by dividing the difference between a cooling initiation temperature and a final cooling temperature by time from the initiation of cooling to the final cooling temperature.

Next, the mixture is warmed up to 0 to 200° C., preferably 0 to 150° C., more preferably 0 to 120° C., and most preferably 0 to 50° C. As a result, the polymer is dissolved in the organic solvent. The mixture may be warmed up simply by placing at room temperature or in a warm bath. The warm-up rate is preferably 4° C./minute or more, more preferably 8° C./minute or more, and most preferably 12° C. or more. The faster the warm-up rate, the better. However, 10,000° C./second is a theoretical uppermost limit, 1,000° C./second is a technical uppermost limit, and 100° C./second is a practical uppermost limit. Note that the warm-up rate is obtained by dividing the difference between a warm-up initiation temperature and a final warm-up temperature by time from the initiation of warm-up to the final warm-up temperature. In this manner, a homogeneous solution can be obtained. When dissolution is not sufficient, cooling and warm-up operations may be repeated. Whether dissolution is sufficient or not can be judged simply by observing the appearance of a solution visually.

In dissolution and cooling, an airtight vessel is desirably used to avoid contamination with moisture content of condensation generated during a cooling operation. In the cooling and warm-up operations, dissolution time can be reduced by applying pressure in a cooling operation and reducing pressure in a warm-up operation. A pressure resistant vessel is desirably used to apply or reduce pressure. Note that, when a 20% (by mass) solution of cellulose acetate (acetylation degree: 60.9%, viscometric degree of polymerization: 299) dissolved in methyl acetate by dissolution and cooling, is measured by differential scanning calorimetry (DSC), it is found that a pseudo phase transition point between a sol state and a gel state is present at near 33° C. This means that the solution becomes a homogenous gel form at this temperature or less. Therefore, the solution must be kept at not less than a pseudo phase transition temperature, preferably at near the pseudo phase transition temperature+10° C. However, the pseudo phase transition temperature varies depending upon the acetylation degree and viscometric degree of polymerization of cellulose acetate, its concentration in a solution, and a solvent to be used.

A polymer film is formed by a solvent cast method from the polymer solution (dope) thus prepared. The dope is spread on a drum or a band and a solvent is vaporized to form the film. The concentration of the dope is preferably controlled such that a solid matter is contained in an amount of 18 to 35% before spreading. The surface of the drum or band is preferably processed like a mirror surface. The dope is preferably spread on the drum or band having a surface temperature of 10° C. or less. After spreading, the dope is preferably dried by exposing it to air for 2 seconds or more. The obtained film is stripped off from the drum or band and further dried by exposing it to hot air while gradually varying temperature from 100 to 160° C. to evaporate the remaining solvent. In this manner, the time from spreading to stripping off can be reduced. To carry out this method, the dope must be gelatinized at a surface temperature of the drum or band during spreading.

To improve mechanical characteristics or a dry rate, a plasticizer can be added to a polymer film. As a plasticizer, a phosphate or a carboxylate may be used. Examples of a phosphate may include triphenyl phosphate (TPP) and tricresyl phosphate (TCP). As an example of a carboxylate, phthalate and citrate are typically mentioned. Furthermore, examples of a phthalate include dimethyl phthalate (DMP), diethyl phthalate (DEP), dibutyl phthalate (DBP, dioctyl phthalate (DOP), diphenyl phthalate (DPP), and diethylhexyl phthalate (DEHP)). Examples of a citrate include acetyl triethyl citrate (OACTE), and acetyl tributyl citrate (OACTB). Examples of other carboxylates include butyl oleate, methyl acetyl ricinoleate, dibutyl sebaciate, and trimellitic esters. Of them, a phthalate based plasticizer (DMP, DEP, DBP, DOP, DPP, DEHP) is preferable and DEP and DPP are particularly preferable. The amount of a plasticizer is preferably 0.1 to 25% by mass based on the amount of a cellulose ester, more preferably 1 to 20% by mass, and most preferably 3 to 15% by mass.

To a polymer film, various additives can be added depending upon use. Examples of additives include an anti-UV light agent, fine particles, release agent, antistatic agent, anti-degradant (e.g., antioxidant agent, peroxide decomposing agent, radical inhibitor, metal deactivator, acid trapping agent, amine), and infrared light absorbing agent. These additives may be a solid state or oily state. Furthermore, when a film is formed of multiple layers, the types and amounts of additives to be added to individual layers may differ from each other. This is more specifically described in Japanese Journal of Technical Disclosure No. 2001-1745 and substances specifically described in the technology described on pages 17 to 22 of the disclosure may be preferably used. The amounts of these additives are not particularly limited as long as they effectively work; however, they may be preferably used appropriately in an amount within the range of 0.001 to 20% by mass based on the whole composition of a polymer film. In particular, an antidegradant may be added preferably in an amount of 0.01 to 1% by mass and more preferably 0.01 to 0.2% by mass based on the solution (dope) to be prepared. Preferable examples of such an antidegradant include butylated hydroxytoluene (BHT) and tribenzylamine (TBA).

Retardation can be controlled further by extension treatment of a polymer film. An extension rate is preferably 3 to 100%. The thickness of a polymer film is preferably 30 to 200 μm and more preferably 40 to 120 μm.

[Alkaline Saponification]

Alkaline saponification of a polymer film is performed by steps of previously heating to room temperature or more, applying an alkaline solution onto the polymer film, maintaining the temperature of the polymer film at room temperature or more, and washing off the alkaline solution from the polymer film.

In the step of previously heating the polymer film to room temperature or more, hot-blast heating, contact heating by a heating roller, induction heating by micro waves, or radiation heating by infrared heater can be preferably used. In particular, the contact heating by a heating roller is preferable for the reasons that heat transfer efficiency is high, the installation area is small, and the start-up of film temperature is high at film-transfer initiation time. Use may be made of a double jacket roll and an electromagnetic induction roll (manufactured by Tokuden Inc.) generally used. The temperature of a film after heating is preferably 25 to 150° C. (higher than 25° C. and lower than 150° C.), more preferably 25 to 100° C., and most preferably 40 to 80° C.

In the step of applying an alkaline solution to a polymer film, variations in the amount of alkaline solution in the thickness direction of the polymer film and in the passage of coating time are preferably suppressed to less than 30%. Furthermore, a continuous coating method is preferably employed. As a coating system, use may be preferably made of a die coater (extrusion coater, slide coater), roll coater (forward roll coater, backward roll coater, gravure coater), and rod coater (rod made of winding thin-metal wire). Since the alkaline solution is washed with water after coating with the alkaline solution, the coating amount thereof is desirably suppressed as much as possible, taking wastewater treatment into consideration. For the reason, it is particularly preferable to use a rod coater, gravure coater and blade coater, which are all stably used even if the coating amount is low.

The alkaline solution can be prepared by dissolving alkali in water or a solution mixture of an organic solvent and water.

Not less than two types of organic solvents may be used in admixture. It is desirable that the organic solvent to be used may not dissolve or swell a polymer film. Furthermore, it is desirable to choose an organic solvent having an appropriately low surface tension so as to facilitate coating with an alkaline solution. Examples of such an organic solvent include monovalent alcohols (e.g., methanol, ethanol, n-propanol, isopropanol, n-butanol, isobutanol, cyclohexanol, benzyl alcohol, fluorinated alcohol); ketones (e.g., acetone, methyl ethyl ketone, methyl isobutyl ketone); and esters (e.g., methyl acetate, ethyl acetate, butyl acetate); polyols (e.g., ethylene glycol, diethylene glycol, propylene glycol, ethylene glycol diethyl ether); amides (e.g., N,N-dimethyl formamide, dimethyl formamide); amines (e.g., perfluorotributyl amine, triethyl amine); sulfoxides (e.g., dimethyl sulfoxide); and ethers (e.g., methyl cellosolve).

As a device for reducing surface tension to facilitate coating and for improving a coated film in stability to prevent repulsion, an anionic, cationic, nonionic, or amphoteric surfactant of low molecular weight or high molecular weight may be added to an alkaline solution.

As the alkali used herein, both inorganic alkali and organic alkali may be used. A strong base is preferable in order to cause a saponification reaction at a low concentration. Hydroxides of alkaline metals (e.g., NaOH, KOH), hydroxides of alkaline earth metals (e.g., $Mg(OH)_2$, $Ca(OH)_2$, $Ba(OH)_2$) and free bases of complex salts (e.g., $[Pt(NH_3)_3](OH)_4$ are preferable. Of them, hydroxides of alkaline metals are more preferable and NaOH and KOH are the most preferable.

The concentration of an alkaline solution is determined depending upon the type of alkali to be used, reaction temperature, and reaction time. In order to complete a saponification reaction in a shorter time, the alkaline solution is preferably prepared in a high concentration. However, if the alkaline concentration is too high, the stability of the alkaline solution is degraded and precipitation is sometimes generated in long-time coating. The concentration of the alkaline solution is preferably from 0.1 to 5 N, more preferably from 0.5 to 5 N, and most preferably from 0.5 to 3 N.

The coating amount of alkali required for saponification is determined based on the total number of saponification sites (=theoretical coating amount of alkali), which is obtained by multiplying the number of saponification reaction sites per unit area of a polymer film by a saponification depth required for imparting adhesiveness to an oriented layer. Since alkali is consumed and a reaction rate decreases as the saponification reaction proceeds, it is preferred to apply several times the theoretical coating amount of alkali in practice. To be more specifically, preferably 2 to 20 times and more preferably 2 to 5 times the theoretical coating amount of alkali is used.

The temperature of an alkaline solution is desirably equal to the reaction temperature (i.e., the temperature of a polymer film). Depending upon the type of organic solvent to be used, the reaction temperature may exceed the boiling point of the alkaline solution in some cases. However, in order to perform coating stably, the temperature of the alkaline solution is preferably lower than the boiling point of the alkaline solution, more preferably lower than 90% of the boiling point (° C.), and further preferably lower than 80% of the boiling point (° C.). After completion of coating with the alkaline solution, the temperature of a polymer film is kept at room temperature or more until the saponification reaction is completed. The room temperature used in this specification refers to 25° C.

The heating device used herein is chosen on the ground that one of the surfaces of a polymer film is wet with an alkaline solution. Hot blast heating applied to an uncoated surface of a film, contact heat transfer by a heat roller, induction heating by microwaves, or radiation heating by an infrared heater may be used preferably. The infrared heater is preferable since heating can be made in noncontact with the coated surface and without contaminating air, with the result that the effect of the alkaline solution upon the coated surface can be suppressed to a minimum. As the infrared heater, a far-infrared ceramic heater of an electric, gaseous, oil or steam system can be used. Alternatively, a commercially available infrared heater (manufactured by Noritake Co. Ltd.) may be used. The infrared heater of an oil or steam system using oil or steam as a heat medium are preferably used from an explosion proof point of view in the case where the heater is used in the atmosphere containing an organic solvent. The temperature of a polymer film may be the same as or different from that of the film heated before the alkaline solution is applied. Alternatively, the temperature of the film may be changed continuously or stepwise in a saponification reaction. The film temperature is not less than 25° C. and less than 150° C., preferably not less than 25° C. and less than 100° C., further preferably, not less than 40° C. and less than 80° C. The temperature of a film can be detected by a commercially available non-contact type infrared thermometer generally used. To control the temperature within the range mentioned above, a heating device may be controlled by a feedback manner.

The saponification is preferably performed while transferring a polymer film. The transfer rate of the polymer film is determined by taking a composition of the alkaline solution and a coating system in combination. Generally, the transfer rate is preferably 10 to 500 m/minute, and more preferably 20 to 300 m/minute. In order to carry out a stable coating operation in accordance with a transfer rate, the characteristics (specific weight, viscosity, surface tension) of the alkaline solution, coating system and conditions for the coating operation are determined.

There are three methods for terminating saponification reaction between an alkaline solution and a polymer film. In the first method, the alkaline solution applied on the film is diluted to reduce the alkaline concentration, thereby reducing a reaction rate. In the second method, the temperature of the polymer film coated with the alkaline solution is reduced, thereby reducing a reaction rate. In the third method, the alkaline solution is neutralized by an acidic solution.

To dilute the alkaline solution applied to a film, use can be made of a method of applying a solvent for dilution (diluting solvent) to a polymer film, a method of spraying a diluting solvent to a polymer film, or a method of soaking a polymer film in its entirety in a vessel containing a diluting solvent. Of them, the method of applying a diluting solvent to a film and the method of spraying a diluting solvent to a film are preferable in view of practical operation performed while transferring a polymer film continuously. The method of applying a diluting solvent to a film is the most preferable since it can be performed by use of a minimum requisite amount of solvent.

A method capable of applying the solvent continuously on the polymer film coated with an alkaline solution is desirably used for applying a diluting solvent. A diluting solvent is preferably applied by use of a die coater (extrusion coater, slide coater), roll coater (forward roll coater, backward roll coater, gravure coater), or rod coater (rod made of winding thin-metal wire). To decrease alkaline concentration by quickly mixing an alkaline solution and a diluting solvent, a roll coater or a rod coater, which forms non uniform flow, is preferred rather than a die coater, which forms a laminar flow in a small region (sometimes called "coating bead") coated with the diluting solvent.

Since the diluting solvent is used to decrease alkaline concentration, the diluting solvent must dissolve an alkaline solute of an alkaline solution. Therefore, water or a solution mixture of an organic solvent and water is used. Not less than two types of organic solvents may be used in admixture. It is desirable that the organic solvent to be used may not dissolve or swell a polymer film. Furthermore, it is desired to choose an organic solvent having an appropriately low surface tension. Examples of such an organic solvent include monovalent alcohols (e.g., methanol, ethanol, n-propanol, isopropanol, n-butanol, isobutanol, cyclohexanol, benzyl alcohol, fluorinated alcohol); ketones (e.g., acetone, methyl ethyl ketone, methyl isobutyl ketone); esters (e.g., methyl acetate, ethyl acetate, butyl acetate); polyols (e.g., ethylene glycol, diethylene glycol, propylene glycol, ethylene glycol diethyl ether); amides (e.g., N,N-dimethyl formamide, dimethyl formamide); amines (e.g., perfluorotributyl amine, triethyl amine); sulfoxides (e.g., dimethyl sulfoxide); and ethers (e.g., methyl cellosolve).

The amount (coating amount) of diluting solvent is determined depending upon the concentration of the alkaline solution applied on the film. In the case of a die coater, which forms a laminar flow in a coating bead, the diluting solvent is preferably used in such an amount that the alkaline solution is diluted 1.5 to 10 times the original concentration thereof, more preferably, 2 to 5 times. In the cases of a roll coater and a rod coater, since the fluid state within a coating bead is not uniform, the alkaline solution and the diluting solvent are mixed and the resultant solution mixture is then applied again to the film. In this case, a dilution rate cannot be specified based on the amount of diluting solvent. Thus, after application of the diluting solvent, alkaline concentration must be measured. In the cases of a roll coater and a rod coater, it is preferable to apply a diluting solvent in such an amount that the alkaline solution is diluted 1.5 to 10 times the original concentration, more preferably, 2 to 5 times.

To quickly terminate the saponification reaction by alkali, acid may be used. To neutralize alkali by a small amount of acid, strong acid is preferably used. To facilitate washing with water, it is preferable to choose an acid that is neutralized with alkali to produce a highly water soluble salt. More specifically, hydrochloric acid, nitric acid, phosphoric acid, and chromic acid are particularly preferable. To neutralize the applied alkaline solution with acid, use is made of a method of applying an acidic solution to a film, a method of spraying an acidic solution to a film, a method of soaking a polymer film in its entirety in a vessel containing an acidic solution. Of them, the method of applying an acidic solution to a film and a method of spraying an acidic solution to a film are preferable for a coating operation in practice, which is performed while transferring a polymer film continuously. The method of applying an acidic solution to a film is the most preferable since it can be performed by use of a minimum requisite amount of acidic solution.

A method capable of applying the acidic solution continuously on the polymer film coated with an alkaline solution is desirable to apply an acidic solution. An acidic solution is preferably applied by use of a die coater (extrusion coater, slide coater), roll coater (forward roll coater, backward roll coater, gravure coater), and rod coater (rod made of winding thin-metal wire). To neutralize alkali by quickly mixing an alkaline solution and an acidic solution, a roll coater or a rod coater, which forms non uniform flow, is preferred rather than a die coater, which forms a laminar flow in a small region (sometimes called "coating bead"), coated with the acidic solution.

The coating amount of acidic solution is determined depending upon the type of alkali and the concentration of the alkaline solution applied on the film. In the case of a die coater, which forms a laminar flow in a coating bead, the acidic solution is preferably applied in an amount 0.1 to 5 times as large as that of original alkaline solution, more preferably, 0.5 to 2 times. In the cases of a roll coater and a rod coater, since the fluid state within a coating bead is not uniform, the alkaline solution and the acidic solution are mixed and this solution mixture is then applied again to the film. In this case, the neutralization rate cannot be determined by the amount of acidic solution applied. Thus, after application of the acidic solution, alkaline concentration must be measured. In the cases of a roll coater and a rod coater, it is preferable that the amount of acidic solution is determined such that a pH value after application of the acidic solution becomes 4 to 9, and more preferably, 6 to 8.

The saponification reaction can be terminated by lowering the temperature of a polymer film. The saponification reaction is substantially terminated by sufficiently lowering the temperature of a polymer film which is maintained at room temperature or more for accelerating the reaction. A device for decreasing the temperature of a polymer film is determined on the ground that one of the surfaces of the polymer film is wet. Cold blast applied to an uncoated surface of a film and contact heat transfer by a cold roller can be preferably used. The temperature of the film after cooling is preferably 5 to 60° C., more preferably 10 to 50° C., and most preferably 15 to 30° C. The temperature of the film is preferably measured by a non-contact type infrared thermometer. The cooling temperature can be regulated by performing a feedback control to a cooling device based on the measured temperature.

The washing step is performed to remove an alkaline solution. More specifically, if the alkaline solution remains, not only the saponification reaction proceeds but also the film formation of an oriented layer (formed later by coating) and orientation of crystal molecules of a liquid crystal molecular layer are affected. To prevent these, the washing step is performed. Washing with water can be performed by a method of applying water, a method of spraying water, or a method of soaking a polymer film in its entirety in a water-containing vessel. Of them, the method of applying water and a method of spraying water are preferable since they are suitable for carrying out while transferring a polymer film continuously. The method of spraying water is particularly preferable since water sprayed onto the polymer film is mixed with the alkaline coating solution by means of spray power to form a turbulent mixture.

Water can be sprayed by a method using a coating head (fountain coater, frog mouth coater) or a method of using a splay nozzle which is used for humidification of air, painting, and automatic washing of a tank. Conical or sector spray nozzles can be arranged along a thickness direction of a polymer film so as to hit water stream to the entire width. Commercially available spray nozzles (for example, manufactured by Ikeuchi or Spraying Systems) may be used. A rate of spraying water is preferably high because turbulent mixture can be obtained. However, if the spray rate is too high, a polymer film may not be transferred stably in a continuous transfer system. A collision rate of water when sprayed is preferably 50 to 1000 cm/second, more preferably 100 to 700 cm/second, and the most preferably 100 to 500 cm/second.

The amount of water to be used in washing should be larger than that calculated based on a theoretical dilution rate defined below.

Theoretical dilution rate=the amount of water applied for washing [cc/m$^2$]/the amount of alkaline coating solution [cc/m$^2$]

The theoretical dilution rate is defined on the assumption that the whole amount of water for washing contributes to dilution and mixing of an alkaline coating solution. Actually, since the whole amount of water does not contribute to form a mixture, a larger amount of water than that derived from the theoretical dilution rate is used in practice. The amount of water varies depending upon the alkaline concentration of alkaline coating solution used, additives, and type of a solvent(s); however, water is used in an amount providing a dilution rate of at least 100 to 1000 times, preferably 500 to 10,000, more preferably 1,000 to 100,000.

When a predetermined amount of water is used for washing, it is better to divide the predetermined amount of water into several portions and wash a polymer film several times rather than to use the whole amount of water at a time. More specifically, the amount of water is divided into several portions and supplied to a plurality of washing devices arranged in tandem in the transfer direction of a polymer film. The plurality of devices are arranged at appropriate intervals to accelerate diffusion to dilute an alkaline coating solution. More preferably, a polymer film is transferred while inclining it. If so, water on the film flows along the film surface, with the result that the alkaline coating solution is diluted by fluid migration as well as diffusion. Most preferably, a dewatering device is provided between adjacent washing devices, for removing water film on a polymer film. By virtue of such a dewatering device, dilution efficiency with water can be further improved. Specific examples of such a dewatering device include a blade used in a blade coater, an air knife uses in an air knife coater, a rod uses in a rod coater, and a roll uses in a roll coater. Note that the more the number of washing devices arranged in tandem, the better. However, in view of installation space and equipment cost, usually 2 to 10, preferably 2 to 5 devices are arranged in tandem.

The water film obtained after water is removed by the dewatering device is preferably thin. The minimum water film thickness is restricted depending upon the type of dewatering device to be used. In a method of removing water by bringing a solid matter such as a blade, rod, or roll physically in contact with a polymer film, even if the solid matter is formed of an elastic material low in rigidity such as rubber, it may possibly scratch a film surface and the elastic material may worn out by friction. Therefore, it is necessary to leave water as a lubricant in a limited thickness. The thickness of water film to be left as a lubricant is usually several μm or more, preferably, 10 μm or more. As a dewatering device capable of removing water to a minimum thickness, an air knife is preferable. The air knife can remove water to a thickness as close as zero. However, when the amount of sprayed air is too large, a polymer film flutters and moves asides, rendering transfer of a polymer film unstable, in some cases. Therefore, the spray amount and pressure of air are limited within a preferable range. The speed of air varies depending upon the initial water film thickness on a polymer film and a transfer speed of the film; however usually falls from 10 to 500 m/second, preferably 20 to 300 m/second, more preferably 30 to 200 m/second. Furthermore, to remove a water film uniformly, the positions of air outlets of an air knife and an air supply method to the air knife are controlled such that the distribution of air flow in the thickness direction falls generally within 10%, and preferably within 5%. The narrower the interval between the surface of the transferred polymer film and the air outlets of the air knife, the better. This is because the efficiency of dewatering performance increases. However, when the interval is narrow, there is a high possibility that the air outlets come into contact with the polymer film to scratch the surface. Hence, the air knife is positioned at an appropriate interval, which is usually 10 μm to 10 cm, preferably 100 μm to 5 cm, and more preferably 500 μm to 1 cm. Furthermore, the interval is kept stable by arranging a back-up roll on the opposite side of the washing surface of the polymer film so as to face the air knife. Besides this, the arrangement of the back-up roll is preferable because fluttering, wrinkle, and deformation of a film can be mitigated.

As water for use in washing, pure water is preferably used. The pure water to be used in the present invention is defined as follows: its specific electrical resistance is at least 1 MΩ; metal ions such as sodium, potassium, magnesium and calcium are present in an amount of less than 1 ppm, and anions such as chloro and nitric acid are present in an amount of less than 0.1 ppm. The pure water can be easily obtained by using a reverse osmotic membrane, ion exchange resin, and distillation singly or in combination.

The higher the temperature of washing water, the better. This is because cleaning performance increases. However, in the method of spraying water to a polymer film while transferring, the area of water to be in contact with air is large. In this case, vaporization of water significantly increases as the temperature of water rises, with the result that peripheral humidity increases and the possibility of condensation increases. For this reason, the temperature of washing water is usually set within the range of 5 to 90° C., preferably 25 to 80° C., and more preferably 25 to 60° C.

When the components of an alkaline coating solution or products of saponification are not dissolved in water easily, a step of washing with a solvent may be added to the process before or after the step of washing with water, to remove the insoluble components. To the step of washing with a solvent, the method of washing with water and the dewatering device mentioned above may be used. Examples of the organic solvent used herein include monovalent alcohols (e.g., methanol, ethanol, n-propanol, isopropanol, n-butanol, isobutanol, cyclohexanol, benzyl alcohol, fluorinated alcohol; ketones (e.g., acetone, methyl ethyl ketone, methyl isobutyl ketone); esters (e.g., methyl acetate, ethyl acetate, butyl acetate); polyols (e.g., ethylene glycol, diethylene glycol, propylene glycol, ethylene glycol diethyl ether); amides (e.g., N,N-dimethyl formamide, dimethyl formamide); amines (e.g., perfluorotributyl amine, triethyl amine); sulfoxides (e.g., dimethyl sulfoxide); and ethers (e.g., methyl cellosolve).

Following the step of washing with water, a drying step can be performed. Since a water film can be sufficiently removed by a dewatering device such as an air knife, generally such a drying step is not required. Drying may be performed for controlling moisture content to a preferable value by heating before a polymer film is wound up in the form of a roll. Conversely, humidity can be imparted by air flow having a predetermined humidity.

[Optical Compensation Sheet]

A polymer film treated with saponification is preferably used as a transparent substrate for an optical compensation sheet. The optical compensation sheet has a layer structure formed of a polymer film saponified by applying an alkaline solution, a resin layer for forming an oriented layer, and an optical anisotropic layer having liquid crystal molecules immobilized in orientation, layered in this order.

The oriented layer is formed by steps of heating a polymer film, applying an alkaline solution onto the surface for orientation of the polymer film, maintaining the temperature of an alkaline solution coated surface, terminating a reaction, and washing to remove an alkaline solution from the surface of the film. Furthermore, a step of coating and drying the oriented layer can be added. Furthermore, the oriented layer is coated and dried, and the surface of the oriented layer is rubbed and then a liquid crystal molecular layer is coated and dried. In this manner, a final optical compensation sheet is obtained.

A high productivity can be obtained by performing not only the saponification but also formation of the oriented layer and liquid crystal molecular layer, integrally in one step. This method has the following advantages. There is no time lag between the saponification step and the oriented layer coating step. Deterioration of the activated surface due to saponification is low. A wet-process dust removal step can be simultaneously performed with the washing step during saponification. In feeding out a polymer film roll and winding the roll in a plurality of time, waste of the end portion of roll is usually generated; however, in this method, such a loss of roll end is not generated.

The optical compensation sheet is formed of a transparent substrate formed of a polymer film saponified, an oriented layer formed on the transparent substrate, and an optical anisotropic layer formed on the oriented layer and having a disc-form structural unit. The oriented layer is preferably formed of a crosslinked polymer and rubbed.

As the compound to be used in the optical anisotropic layer and a disc-form structural unit, use is made of a polymer obtained by polymerization of a disc-form liquid crystal compound (monomer) of a low molecular weight or a polymerized liquid crystal compound of a disc-form. Disc-form compounds (discotic compound are, in general, roughly classified into compounds having a discotic liquid crystal phase (i.e., nematic discotic phase) and compounds having no discotic liquid crystal phase. The disc-form compound generally has a negative birefringence. The optical anisotropic compound takes advantage of the negative birefringence of such a discotic compound.

[Oriented Layer]

The oriented layer of the optical anisotropic layer is preferably formed by rubbing a film formed of a crosslinked polymer. More preferably, the oriented layer is formed of two types of crosslinked polymers. One of the two types of polymers is capable of crosslinking by itself or a polymer crosslinked with the help of a crosslinking agent. The oriented layer is formed by permitting a polymer having a functional group or a polymer having a functional group introduced therein to react between polymer molecules with the aid of light, heat or pH change, or formed by a crosslinking agent high in reactivity to introduce a linking group derived from the crosslinking agent, thereby crosslinking polymer molecules.

The crosslinking of a polymer is performed by applying a coating liquid containing a polymer or a mixture of a polymer and a crosslinking agent onto a transparent substrate, followed by heating. The crosslinking treatment may be performed in any stage of a process after an oriented layer is coated on the transparent substrate until an optical compensation sheet is obtained. In consideration of the orientation of a compound (optical anisotropic layer) having a disc-form structure formed on the oriented layer, it is also preferable that a compound having a disc-form structure is oriented and thereafter final crosslinking is performed. To describe more specifically, a coating solution containing a polymer and a crosslinking agent capable of crosslinking the polymer is applied onto a transparent substrate, dehydrating the substrate with heating, and rubbing the resultant surface to form an oriented layer. Thereafter, a coating solution containing a compound having a disc-form structure is applied onto the oriented layer, and the resultant structure is heated to a discotic nematic phase forming temperature or more, and then cooled to form an optical anisotropic layer.

As the polymer to be used in the oriented layer, either a polymer capable of crosslinking by itself or a polymer crosslinked by a crosslinking agent may be used. A plurality of combinations of these may be used. Examples of such a polymer include polymethyl methacrylate, an acrylic acid/methacrylic acid copolymer, styrene/maleic imide copolymer, polyvinyl alcohol, modified polyvinyl alcohol, poly(N-metelol acryl amide), styrene/vinyl toluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, carboxymethyl cellulose, polyethylene, polypropylene and polycarbonate. A silane coupling agent can be used as a polymer. Of them, a water soluble polymer (e.g., poly(N-metelol acryl amide), carboxymethyl cellulose, gelatin, polyvinyl alcohol, and modified polyvinyl alcohol are preferable, gelatin; polyvinyl alcohol and modified polyvinyl alcohol are more preferable; and polyvinyl alcohol and modified polyvinyl alcohol are the most preferable. It is particularly preferable that two types of unmodified or modified polyvinyl alcohols, which are in degree of polymerization, are used in combination.

The degree of saponification of a polyvinyl alcohol is preferably 70 to 100%, more preferably 80 to 100%, and most preferably 85 to 95%. The degree of polymerization of a polyvinyl alcohol is preferable 100 to 3000. The modifying group of a modified polyvinyl alcohol may be introduced by modification due to copolymerization, modification due to chain transfer or modification due to block polymerization. Examples of a copolymerization modifying group include $COONa$, $Si(OX)_3$, $N(CH_3)_3Cl$, $C_9H_{19}COO$, $SO_3Na$ and $C_{12}H_{25}$, where X is a proton or cation. Examples of chain transfer modifying group include $COONa$, $SH$, and $C_{12}H_{25}$.

Examples of block polymerization modifying group include $COOH$, $CONH_2$, $COOR$ and $C_6H_5$, where R is an alkyl group.

An unmodified polyvinyl alcohol or alkylthio-modified polyvinyl alcohol having a saponification degree of 85 to 95% is the most preferable.

The modified polyvinyl alcohol is preferable a reaction product between a compound represented by the following formula (1) and a polyvinyl alcohol

[Formula 1]

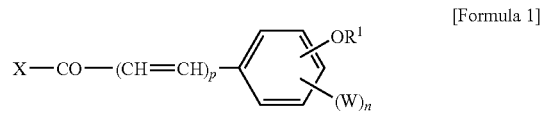

In the formula (1), $R^1$ is an unsubstituted alkyl group, acryloyl-substituted alkyl group, methacryloyl-substituted alkyl group, or epoxy-substituted alkyl group; W is a halogen atom, alkyl group or alkoxy group; X is an atomic group required for forming an active ester, acid anhydride, or acid halide; P is 0 or 1; and n is an integer of 0 to 4.

The modified polyvinyl alcohol is more preferably a reaction product between a compound represented by the following formula (2) and a polyvinyl alcohol.

[Formula 2]

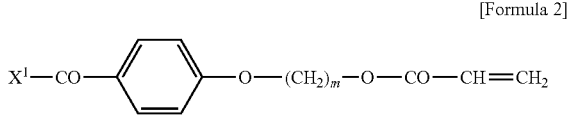

In the formula (2), $X^1$ is an atomic group required for forming an active ester, acid anhydride, or acid halide; and m is an integer of 2 to 24.

The polyvinyl alcohol to be reacted with a compound represented by the formula (1) or (2) may be a modified polyvinyl alcohol (copolymerization modification, chain transfer modification, block polymerization modification). A method of synthesizing a polyvinyl alcohol, measurement of visible light absorption spectrum and a method of determining an introduction rate of a modifying group are described in Japanese Patent Application Laid Open No. 8-338913.

Examples of a crosslinking agent for a polymer (preferably, a water-soluble polymer, more preferably, polyvinyl alcohol or modified polyvinyl alcohol) include aldehydes (e.g., formaldehyde, glyoxal, glutaraldehyde), N-methylol compounds (dimethylol urea, meterol dimethyl hydantoin); dioxane derivatives (e.g., 2,3-dihydroxydioxane); compounds which work by activating a carboxyl group (e.g., carbenium, 2-naphthalene sulfonate, 1,1-bispyrolidino-1-chloropyridinium, 1-morpholinocarbonyl-3-(sulfonate aminomethyl)), active vinyl compounds (e.g., 1,3,5-triacroyl-hexahydro-s-triazine, bis(vinylsulfone)methane, N,N'-methylene bis-[β-(vinylsulfonyl)propione amide]); and active halogen compounds (e.g., 2,4-dichloro-6-dihydroxy-S-triazine), isoxazole and dialdehyde starch). Not less than two types of crosslinking agents may be used simultaneously. Of them, aldehyde having a high reactivity, in particular, glutaraldehyde, is preferable.

The amount of crosslinking agent is preferably 0.1 to 20% by mass and more preferably, 0.5 to 15% by mass based on the amount of a polymer. The amount of crosslinking agent remained unreacted in an oriented layer is preferably not more than 1.0% by mass, and more preferably not more than 0.5% by mass. If a crosslinking agent remains in an oriented layer in an amount exceeding 1.0% by mass, sufficient durability cannot be obtained. If such an oriented layer is used in a liquid crystal display device and used for a long time or allowed to stand under a high temperature/high humidity atmosphere for a long time, reticulation may sometimes take place.

An oriented layer can be formed by applying a solution containing the polymer serving as an oriented layer forming material and a crosslinking agent onto a transparent substrate, followed by dehydrating (crosslinking) with heating, and rubbing it. The crosslinking reaction is performed in any time after the transparent substrate is coated. When a water soluble polymer such as polyvinyl alcohol is used as a material for an oriented layer, a solvent mixture of water and an organic solvent (e.g., methanol) having a defoaming action is preferably used as a coating solution. The ratio of water to methanol is preferably from 0:100 to 99:1, and more preferably 0:100 to 91:9. By virtue of this, foam generation can be suppressed and the number of defects on the surface of the oriented layer and optical anisotropic layer can be significantly reduced.

Coating of an oriented layer is preferably performed by a spin coating, dip coating, curtain coating, extrusion coating, rod coating or roll coating. Of them, a rod coating method is preferable. The thickness of the oriented layer after drying is preferably 0.1 to 10 μm. Heat drying may be performed at 20 to 110° C. To form sufficient crosslinks, heat drying is preferably performed at 60 to 100° C., and particularly preferably 80 to 100° C. The drying is performed for 1 minute to 36 hours, preferably 1 to 30 minute. The pH is preferably set at an optimal value for the crosslinking agent to be used. When glutaraldehyde is used, pH is 4.5 to 5.5, and particularly preferably, 5.

The oriented layer is provided on a transparent substrate or on the aforementioned undercoat layer. The oriented layer is obtained by performing crosslinking of a polymer layer and applying rubbing treatment onto the surface. The oriented layer is provided to define the orientation direction of a liquid crystal discotic compound to be placed thereon.

As the rubbing treatment, use is made of a method widely used in a step of liquid crystal orientation processing step for an LCD. To describe more specifically, when the surface of an oriented layer is rubbed in the same direction by use of paper, gauze, felt, rubber, or nylon fiber or polyester fiber, orientation can be obtained. Generally, orientation is obtained by rubbing the surface several times by a cloth in which fibers uniform in length and diameter are uniformly implanted.

[Optical Anisotropic Layer]

The optical anisotropic layer of an optical compensation sheet is formed on the oriented layer. The optical anisotropic layer preferably consists of a compound having a disc-form structural unit and has a negative birefringence. The optical anisotropic layer is a polymer layer obtained by polymerization of a disc-form liquid crystal compound (monomer) of a low molecular weight or a polymerization (curing) of a polymeric liquid crystal disc-form compound. Examples of a disc-form (discotic) compound include a benzene derivative, tolxen derivative, cyclohexane derivative, and azacrown-based and phenylacetylene-based macrocycle. A discotic (disc-form) compound has a structure in which each of these compounds is positioned at a molecular center as a nucleus, and substituted with straight chain alkyl or alkoxy groups, or substituted benzoyloxy groups, which are radially extended from the center in a straight chain form. The disc-form compound includes a discotic liquid crystal showing mesomorphism. An optical anisotropic layer formed of a disc-form compound includes a polymer compound which loses mesomorphism as a result that a low molecular weight discotic liquid crystal having a group capable of initiating a reaction induced by heat or light, is polymerized or crosslinked into a polymer.

The optical anisotropic layer is formed of a compound having a discotic structural unit and having a negative birefringence. The surface of the discotic structural unit tilts against a transparent substrate surface and the angle formed between the discotic structural unit and the transparent substrate surface preferably varies in the depth direction of the optical anisotropic layer.

The plane (tilt) angle of the surface of the discotic structure unit generally increases or decreases with an increase of the distance of the optical anisotropic layer from the bottom of the oriented layer in the depth direction thereof. A tilt angle preferably increases with an increase of the distance. Furthermore, change of the tilt angle may include the cases where a tilt angle continuously increases, continuously decreases, intermittently increases, intermittently decreases, and also include the cases a tilt angle continuously increases in some part and continuously decreases in other part, and intermittently increases in some part and intermittently decreases in other part. The intermittent change means that a region at which a tilt angle does not change is included in the middle of the depth direction. The tilt angle preferably increases or decreases as a whole even if it includes such an unchanged region. Furthermore, the tilt angle preferably increases as a whole, and particularly preferably increases continuously.

The optical anisotropic layer can be obtained by applying a solution having a discotic compound and other compounds dissolved in a solvent onto an oriented layer, followed by drying the solution, and heating the resultant layer to a discotic nematic phase forming temperature, followed by cooling the layer while keeping the orientation state (discotic nematic phase). Alternatively, the optical anisotropic layer can be obtained by applying a solution having a discotic compound and other compounds (including, e.g., a polymerizable monomer, and an optical polymerization initiator) dissolved in a solvent onto an oriented layer, followed by drying the solution, heating the dry matter to a discotic nematic phase forming temperature, polymerizing (by irradiation of UV rays) and further cooling it. The discotic nematic liquid crystal-solid phase transition temperature of the discotic nematic liquid crystal compound used in the present invention is preferably 70 to 300° C., and particularly, 70 to 170° C.

The tilt angle of a discotic unit at the side of a substrate can be controlled by selecting a discotic compound or a material for the oriented layer, or selecting a rubbing treatment. Furthermore, the tile angle of a discotic unit at the side of the surface (air side) can be controlled generally by selecting a discotic compound or other compounds (plasticizer, surfactant, polymeric monomer and polymer) to be used with the discotic compound. Moreover, degree of change in tilt angle can be controlled by selecting compounds as mentioned above.

Any compound can be used as a plasticizer, surfactant and polymeric monomer as long as it has an appropriate compatibility with a discotic compound, either changes the tilt angle of a liquid crystal discotic compound or do not inhibit orientation. Of them, a polymeric monomer (e.g., a compound having a vinyl group, vinyloxy group, acryloyl group, and methacryloyl group) are preferable. The aforementioned compounds are generally used in an amount of 1 to 50% by mass and preferably 5 to 30% by mass based on the discotic compound.

Any polymer can be used as long as it has a compatibility with a discotic compound and can change the tilt angle of a liquid crystal discotic compound. As an example of a polymer, cellulose ester may be mentioned. Preferable examples of such a cellulose ester include cellulose acetate, cellulose acetate propionate, hydroxypropyl cellulose and cellulose acetate butylate. The polymer is used in an amount so as not to inhibit the orientation of a liquid crystal discotic compound, which is generally 0.1 to 10% by mass, preferably 0.1 to 8% by mass, and particularly preferably 0.1 to 5% by mass.

[Polarizing Plate]

The polarizing plate has a layer structure obtained by stacking an oriented layer on a polymer film, an optical compensation sheet having an optical anisotropic layer which has a fixed orientation of liquid crystal molecules, a polarizing film, and a. transparent protecting layer successively in the order mentioned. The transparent protecting layer may be formed of a general cellulose acetate film. Examples of the polarizing film include an iodine-based polarizing film, dye-based polarizing film using a dichromatic dye and polyene-based polarizing film. The iodine-based polarizing film and dye-based polarizing film are generally manufactured by use of a polyvinyl alcohol based film. The relationship between the delayed phase axis of the polymer film and the transparent axis of the polarizing film varies depending upon the type of liquid crystal display device to be applied. In the case of liquid crystal display devices of TN, MVA, and OCB modes, they are arranged substantially in parallel. In the case of reflection liquid crystal display device, they are preferably arranged substantially with an angle of 45°.

[Liquid Crystal Display Device]

An optical compensation sheet or polarizing plate is advantageously used in a liquid crystal display device. The liquid crystal display devices of TN, MVA and OCB modes are composed of a liquid crystal cell and two polarizing plates arranged on both sides. A liquid crystal cell has liquid crystal between two electrode substrates. An optical compensation sheet may be arranged alone between the liquid crystal cell and one of the polarizing plates or each between the liquid crystal cell and each of the polarizing plates.

In the case of an OCB mode liquid crystal display device, the optical compensation sheet may have an optical anisotropic layer containing a disc-form compound and a rod-form liquid crystal compound on a polymer film. The optical anisotropic layer is formed by orienting the disc-form compounds (or rod-form compounds) and fixing the orientation state. The disc-form compound generally has a large index of birefringence. Furthermore, the disc-form compound has various orientation states. Therefore, use of the disc-form compound enables to manufacture an optical compensation sheet having optical characteristics that could not be obtained by a conventional drawn film exhibiting birefringence.

In the polarizing plate, the polymer film can be used as a transparent protecting film to be disposed between a liquid crystal cell and the polarizing film. The polymer film may be used only as a transparent protecting film of one of the polarizing plates (to be disposed between a liquid crystal cell and the polarizing film) or used as two transparent protecting films for two polarizing plates (to be disposed between a liquid crystal cell and the polarizing film). The liquid crystal cell of OCB mode or TN mode is preferably used. The liquid crystal cell of OCB mode is used in a liquid crystal display device as a liquid crystal cell of a bend orientation mode where rod-form liquid crystal molecules are oriented such that the molecules of an upper portion are oriented in a reverse direction (i.e., symmetrically) to those of a lower portion of the liquid crystal cell. Because of the up-and-down symmetrical orientation of the rod-form liquid crystal molecules, the bend orientation mode liquid crystal cell has a self optical compensation function. Because of this, this liquid crystal mode is also called as OCB (optically compensatory bend). The liquid crystal display device of a bend orientation mode has an advantage of a high response speed. On the other hand, in the liquid crystal cell of TN mode, rod-form liquid crystal molecules are oriented substantially horizontally when no voltage is applied and further has a twisted orientation of 60 to 120°. The TN mode liquid crystal is most widely used as a color TFT liquid crystal display device and described in numerous literatures.

EXAMPLES

Optical compensation sheets were manufactured by subjecting a substrate having a width L0 of 540 mm to a saponification step, oriented layer coating step, rubbing treatment step, and liquid crystal coating step successively in the order mentioned. At this time, the coating width L2 of an oriented layer was always set at a constant value of 506 mm, whereas coating width L1 for the saponification and coating width L3 for a liquid crystal layer were varied to manufacture optical compensation sheets. To be more specifically, in Example 1, each of coating width L1 (520 mm) and coating width L3 (510 mm) was set at a larger extent than the coating width L2. In Example 2, coating width L3 (510 mm) was set at a larger extent than coating width L2 and the coating width L1 (490 mm) was set to be smaller than coating width L2. Furthermore, in Comparative Example 1, coating width L1 (520 mm) was set at a larger extent than coating width L2, and coating width L3 (500 mm) was set to be smaller than coating width L2. In Comparative Example 2, each of coating width L1 (490 mm) and coating width L3 (500 mm) was set to be smaller than coating width L2. The optical compensation sheets thus manufactured were checked for removal of film. The results are shown in Table 1.

TABLE 1

| | L0 (mm) | L1 (mm) | L2 (mm) | L3 (mm) | Layer removal by saponification | Layer removal during rubbing | Judgment |
|---|---|---|---|---|---|---|---|
| Example 1 | 540 | 520 | 506 | 510 | absent | absent | A |
| Example 2 | 540 | 490 | 506 | 510 | absent | present | B |
| Comparative Example 1 | 540 | 520 | 506 | 500 | present | absent | F |
| Comparative Example 2 | 540 | 490 | 506 | 500 | present | present | F |

As is apparent from Table 1, in Comparative Examples 1 and 2 where coating width L3 is smaller than the coating width L2, film removed during saponification in processing for a polarizing plate. In contrast, in Examples 1 and 2 where coating width L3 is larger than the coating width L2, it was possible to prevent a film from removing during saponification in processing for a polarizing plate. In conclusion, optical compensation sheets free from removal of film were manufactured in Examples 1 and 2.

As is also apparent from Table 1, in Example 2 where coating width L3 alone is larger than coating width L2, a film removed during rubbing treatment, whereas in Example 1 where both of the coating widths L1 and L3 are larger than coating width L2, it was possible to prevent a film from removing during rubbing treatment, without fail. Hence, the yield of optical compensation sheets in the manufacturing process can be improved in Example 1 more than in Example 2.

What is claimed is:

1. An optical compensation sheet, comprising:
an oriented layer on a surface of a substrate; and
a liquid crystal layer on the oriented layer,
wherein the oriented layer is covered with the liquid crystal layer and the width of the liquid crystal layer is greater than the width of the oriented layer.

2. The optical compensation sheet according to claim 1, wherein the liquid crystal layer has a width such that it is wider than the oriented layer by at least 1 mm on at least one side.

3. The optical compensation sheet according to claim 2, wherein the liquid crystal layer has a width such that it is wider than the oriented layer by 2 mm on at least one side.

4. The optical compensation sheet according to claim 1, wherein the liquid crystal layer entirely covers the oriented layer.

5. The optical compensation sheet according to claim 1, wherein the oriented layer is formed on the substrate within an area which has been saponified a width less than the oriented layer is coated.

6. An optical compensation sheet, comprising:
an oriented layer on a surface of a substrate; and a liquid crystal layer on the oriented layer,
wherein the oriented layer is covered with the liquid crystal layer, and
wherein the oriented layer is formed on the substrate within an area which has been saponified wider than the oriented layer is coated.

* * * * *